United States Patent Office 3,681,313
Patented Aug. 1, 1972

3,681,313
METHOD FOR THE PREPARATION OF ETHYL-ENE-CARBOXYLIC ACID COPOLYMERS
Harry D. Anspon, Kansas City, Mo., and Bert H. Clampitt, Overland Park, and Ronald E. Gilbert, Shawnee Mission, Kans., assignors to Gulf Research & Development Company, Pittsburgh, Pa.
No Drawing. Continuation of application Ser. No. 694,046, Dec. 28, 1967. This application Aug. 27, 1970, Ser. No. 67,623
Int. Cl. C08f 27/00
U.S. Cl. 260—86.7
6 Claims

ABSTRACT OF THE DISCLOSURE

An ethylene-carboxylic acid copolymer is prepared by the thermal decomposition of an ethylene-isopropyl ester of acrylic or methacrylic acid in the presence of water vapor or ammonia.

This application is a continuation of Ser. No. 694,046 now abandoned.

BACKGROUND OF THE INVENTION

Ethylene-carboxylic acid copolymers are known in the art. Conventionally, they are prepared by the copolymerization of ethylene and a carboxylic acid employing a free-radical initiator either in the presence or absence of an inert solvent. In the preparation of these copolymers polymerization processes conventionally developed for the high-pressure synthesis of polyethylene are employed. Temperatures above 150° C. and pressures in the range of 50 to 3000 atmospheres are employed in the polymerization reactor. Under such conditions, the acids employed are sufficiently corrosive to result in substantial damage to the high-pressure equipment under continuous operating conditions. Also, the concentration of unsaturated acid in the resulting product copolymer is limited by the solubility of the acid in the liquid organic medium employed in the high-pressure polymerizations.

Therefore, an object of the invention is to provide an improved process for the preparation of ethylene-carboxylic acid copolymers.

Another object of the invention is to provide a process for the preparation of such copolymers whereby corrosion normally resulting in the conventional use of the acid as a comonomer in the polymerization process is eliminated.

Other objects, advantages and features of this invention will be readily apparent to those skilled in the art from the following description and the appended claims.

SUMMARY OF THE INVENTION

By the invention a copolymer comprising ethylene and an isopropyl ester of acrylic or methacrylic acid is heated to an elevated temperature in the presence of water vapor or ammonia until all of the ester groups are decomposed, and a copolymer of ethylene and acrylic or methacrylic acid recovered therefrom. The ester is quantitatively converted to the acid form without causing degradation of the ethylene polymer chain into which the ester of the unsaturated acid is incorporated.

DESCRIPTION OF THE INVENTION

The ethylene copolymers comprising ethylene and the isopropyl ester of acrylic or methacrylic acid and which are thermally decomposed by the process of this invention can be prepared by conventional methods known to the art. A suitable method is described in U.S. 3,350,372 wherein it is stated that ethylene and an alkyl acrylate (to include the isopropyl ester of acrylic or methacrylic acid) are copolymerized at pressures of the order of 10,000–40,000 p.s.i. and at temperatures of at least 200° F. The polymerization reaction can be conducted in the presence of a free-radical polymerization initiator and in the absence of any added solvent other than for minor quantities of catalyst carrier or telogenating agents.

Free-radical polymerization initiators employed in the copolymerization process can be selected from those normally employed in the homopolymerization of ethylene, such as the organic peroxides, e.g., lauryl peroxide, ditertiary butyl peroxide, and tertiary butyl peracetate, an azo compound such as α,α'-azobisisobutyronitrile and α,α'-azobisethylisobutyrate. Typically the free-radical polymerization initiator will be dissolved in a suitable organic liquid such as benzene, mineral oil or the like. Ordinarily, the free-radical initiator will be used at a level of the order of 50 to 20,000 p.p.m. or preferably 100–250 p.p.m. based upon the monomers charged to the reactor.

Although it is within the scope of the invention to employ ethylene-isopropyl acrylate ester copolymers over a wide range of molar ratios of combined ethylene and isopropyl ester, the copolymers employed in the thermal decomposition process will normally contain a maximum of 0.5 mol of isopropyl acrylate ester per mol of contained ethylene. Normally the copolymers will contain at least 1 mol percent of the isopropyl acrylate ester.

The ethylene-isopropyl acrylate or methacrylate copolymer is heated to the ester decomposition temperature in the presence of water vapor (steam) or ammonia, or a mixture thereof, to obtain the product ethylene-acrylic or methacrylic acid copolymer. At atmospheric pressures, the ethylene-isopropyl acrylate or methacrylate copolymer is heated to a temperature of at least 325° C. Although some decomposition may occur at temperatures below 325° C., a complete decomposition of the ester groups in the polymer necessary to obtain the acid copolymer can be obtained only after exceedingly long heating times. Therefore, substantially lower decomposition temperatures are not commercially feasible. The copolymer is maintained at the decomposition temperature until all of the ester groups have been decomposed. The time required to achieve complete thermal decomposition or pyrolysis of the ester radical will depend upon the temperature, decreasing with increasing decomposition temperatures.

It will be understood by those skilled in the art that the decomposition temperature can be adjusted by varying the pressure under which the thermal decomposition process step is performed. By employing superatmospheric pressures, decomposition temperatures above 325° C. are preferred while decomposition pressures substantially below atmospheric pressure will result in a somewhat lower thermal decomposition temperature.

A preferred method of conducting the thermal decomposition of the ethylene-isopropyl acrylate or methacrylate ester copolymer is to employ a conventional melt extruder operating at a temperature of at least 325° C. By this method, the ethylene-isopropyl acrylate or methacrylate ester copolymer can be passed directly from the polymerization reactor to the melt extruder and the product ethylene-acrylic or methacrylic acid copolymer recovered directly from the melt extruder.

The product ethylene-carboxylic acid copolymers of this invention can be employed in coating applications and find particular utility in the preparation of safety glass laminates wherein the ethylene-acrylic or methacrylic acid copolymers are employed as the inner layer.

The objects and advantages of the invention are further illustrated by the following examples. It is not intended, however, that the invention should be limited to the specific embodiments presented therein.

EXAMPLE I

An ethylene-isopropyl methacrylate copolymer is heated at atmospheric pressure to the thermal decomposition temperature of 325° C. in an ammonia atmosphere and the decomposition zone maintained at this temperature until all of the ester groups are decomposed. The isopropyl methacrylate ester concentration of the feed copolymer is 19.3 weight percent.

Infrared analysis of the product copolymer recovered from the thermal decomposition zone indicates that all of the ester groups have been converted to the acid form without causing degradation of the ethylene polymer chain and that the product polymer is an ethylene-methacrylic acid copolymer.

EXAMPLE II

The process of Example I is repeated with the exception that a thermal decomposition temperature of 350° C. is employed. Infrared analysis of the product polymer recovered from the thermal decomposition zone indicates that all of the ester groups have been decomposed to the acid form without substantial degradation of the ethylene polymer chain.

EXAMPLE III

The process of Example I is repeated with the exception that a thermal decomposition temperature of 400° C. is employed. Infrared analysis of the product polymer recovered from the thermal decomposition zone indicates that all of the ester groups have been decomposed to the acid form without substantial degradation of the ethylene polymer chain.

EXAMPLE IV

The ethylene-isopropyl methacrylate copolymer of Example I is heated at atmospheric pressure to the thermal decomposition temperature of 380° C. in an ammonia atmosphere for about 15 minutes. Infrared analysis of the copolymer product recovered from the thermal decomposition zone indicates that all the ester groups have been converted to the acid form without causing degradation of the ethylene polymer chain and that the product polymer is an ethylene-methacrylic acid copolymer.

The intrinsic viscosity [1], as measured in a 50/50 mixture of n-propanol and zylene, of the thermal decomposition polymer product is 0.476 at 99.5° C., the ultimate tensile strength [2] is 1590 p.s.i., and the elongation is 245. The intrinsic viscosity of the ethylene isopropyl methacrylate copolymer feed as measured in xylene at 99.5° C. is 0.629, the ultimate tensile strength is 900 p.s.i. and the elongation is 520. From this it is readily apparent that tensile properties characteristic of the product acid polymer are substantially superior to the tensile properties of the polymer feed.

[1] ASTM D1601-61, 0.20 gram polymer/100 ml.
[2] ASTM D1708-66, extension 1 inch/minute.

EXAMPLE V

An ethylene-isopropyl methacrylate copolymer is heated at atmospheric pressure to the thermal decomposition temperature of 385° C. in an atmosphere of steam for a period of about 10 minutes. The isopropyl methacrylate ester concentration of the feed copolymer is 19.3 weight percent.

Infrared analysis of the product copolymer recovered from the thermal decomposition zone indicates that all of the ester groups have been converted to the acid form without causing degradation of the ethylene polymer chain and that the product polymer is an ethylene-methacrylate acid copolymer.

Although the invention has been described with reference to specific materials, embodiments and details, various modifications and changes, within the scope of this invention, will be apparent to one skilled in the art and are contemplated to be embraced in the invention.

What is claimed is:

1. A process for the preparation of ethylene-carboxylic acid copolymers which consists essentially of heating an ethylene-isopropyl ester of an acrylic or methacrylic acid copolymer to the ester decomposition temperature of at least 325° C. in the presence of a gas selected from the group consisting of steam and ammonia, maintaining said ethylene copolymer at the ester decomposition temperature until substantially all of the ester groups have been decomposed, the ethylene concentration of the ethylene polymer to be heated being at least 2 mols per mol of contained isopropyl ester, and recovering therefrom an ethylene-acrylic or methacrylic acid copolymer.

2. The process of claim 1 wherein the heating step is conducted in a melt extrusion zone.

3. The process of claim 1 wherein said acid is acrylic acid.

4. The process of claim 1 wherein said acid is methacrylic acid.

5. The process of claim 1 wherein said gas is ammonia.

6. The process of claim 1 wherein said gas is steam.

References Cited

UNITED STATES PATENTS

| | | | |
|---|---|---|---|
| 3,557,070 | 1/1971 | Anspon et al. | 260—86.7 |
| 3,078,260 | 2/1963 | Hayes | 260—83.5 |
| 3,132,120 | 5/1964 | Graham et al. | 260—78.5 |
| 3,337,488 | 8/1967 | Lyons et al. | 260—29.6 |
| 3,337,517 | 8/1967 | Anspon | 260—86.7 |
| 3,350,372 | 10/1967 | Anspon et al. | 260—86.7 |
| 3,415,904 | 12/1968 | Taniguchi et al. | 260—897 |
| 3,429,860 | 2/1969 | Hurst | 260—86.7 |

JOSEPH L. SCHOFER, Primary Examiner

J. KIGHT III, Assistant Examiner

U.S. Cl. X.R.

260—80 M, 88.1 PC